US007559201B2

(12) United States Patent
Prociw et al.

(10) Patent No.: US 7,559,201 B2
(45) Date of Patent: Jul. 14, 2009

(54) REDUNDANT FUEL MANIFOLD SEALING ARRANGEMENT (75) Inventors: Lev Alexander Prociw, Elmira (CA); Harris Shafique, Longueull (CA)

(73) Assignee: Pratt & Whitney Canada Corp., Longueuil (CA)

( * ) Notice: Subject to any disclaimer, the term of this patent is extended or adjusted under 35 U.S.C. 154(b) by 550 days.

(21) Appl. No.: 11/220,849

(22) Filed: Sep. 8, 2005

(65) Prior Publication Data

US 2007/0234724 A1 Oct. 11, 2007

(51) Int. Cl.
*F02C 1/00* (2006.01)
(52) U.S. Cl. .............................. 60/739; 60/734; 60/740; 60/746; 60/747
(58) Field of Classification Search .................... 60/734, 60/739, 746, 747, 742, 761; 239/450, 416.1, 239/416.2, 416.3; 285/124.1, 124.2; 138/115–117
See application file for complete search history.

(56) References Cited

U.S. PATENT DOCUMENTS

| 2,151,540 | A |   | 3/1939 | Varga |   |
|---|---|---|---|---|---|
| 2,946,185 | A |   | 7/1960 | Bayer |   |
| 3,213,523 | A |   | 10/1965 | Boehler |   |
| 3,472,025 | A |   | 10/1969 | Simmons et al. |   |
| 3,719,042 | A | * | 3/1973 | Chamberlain | ................ 60/739 |
| 4,100,733 | A |   | 7/1978 | Streibel et al. |   |
| 4,322,945 | A |   | 4/1982 | Peterson et al. |   |
| 4,404,806 | A |   | 9/1983 | Bell, III et al. |   |
| 5,036,657 | A |   | 8/1991 | Seto et al. |   |
| 5,187,936 | A | * | 2/1993 | Kast et al. | ...................... 60/734 |
| 5,253,471 | A |   | 10/1993 | Richardson |   |
| 5,271,219 | A |   | 12/1993 | Richardson |   |
| 5,396,759 | A |   | 3/1995 | Richardson |   |
| 5,400,968 | A |   | 3/1995 | Sood |   |
| 5,419,115 | A |   | 5/1995 | Butler et al. |   |
| 5,423,178 | A |   | 6/1995 | Mains |   |
| 5,570,580 | A |   | 11/1996 | Mains |   |
| 5,579,645 | A |   | 12/1996 | Prociw et al. |   |
| 5,598,696 | A |   | 2/1997 | Stotts |   |
| 5,771,696 | A |   | 6/1998 | Hansel et al. |   |
| 5,848,525 | A |   | 12/1998 | Spencer |   |
| 5,956,955 | A |   | 9/1999 | Schmid |   |
| 5,983,642 | A |   | 11/1999 | Parker et al. |   |
| 5,996,335 | A |   | 12/1999 | Ebel |   |
| 6,109,038 | A |   | 8/2000 | Sharifi et al. |   |
| 6,125,624 | A | * | 10/2000 | Prociw | .................... 60/39.094 |
| 6,141,968 | A |   | 11/2000 | Gates et al. |   |
| 6,149,075 | A |   | 11/2000 | Moertle et al. |   |
| 6,240,732 | B1 |   | 6/2001 | Allan |   |

(Continued)

FOREIGN PATENT DOCUMENTS

CA          1013153         7/1977

(Continued)

*Primary Examiner*—Michael Cuff
*Assistant Examiner*—Phutthiwat Wongwian
(74) *Attorney, Agent, or Firm*—Ogilvy Renault LLP (57) ABSTRACT

A fuel manifold of gas turbine engines comprises a tube for fluid communication with a fuel source and for connection with at least one fuel nozzle tip to thereby define a fuel conveying passage. A redundant seal is provided around the tube and covers substantially an entire length thereof to reduce a risk of fuel leakage of the fuel conveying passage.

17 Claims, 5 Drawing Sheets

U.S. PATENT DOCUMENTS

| | | |
|---|---|---|
| 6,256,995 B1 | 7/2001 | Sampath et al. |
| 6,463,739 B1 | 10/2002 | Mueller et al. |
| 6,761,035 B1 | 7/2004 | Mueller |
| 2003/0014979 A1 | 1/2003 | Summerfield et al. |
| 2004/0040306 A1 * | 3/2004 | Prociw et al. .................. 60/740 |

FOREIGN PATENT DOCUMENTS

| | | |
|---|---|---|
| CA | 2307186 | 5/1999 |

* cited by examiner

REDUNDANT FUEL MANIFOLD SEALING ARRANGEMENT

TECHNICAL FIELD

The invention relates generally to gas turbine engines, and more particularly to fuel manifolds of gas turbine engines.

BACKGROUND OF THE ART

Fuel systems which supply fuel to a combustion chamber in a gas turbine engine are well known in the art. Generally, a plurality of circumferentially distributed fuel nozzles forming an nozzle array in the combustion chamber, are used to ensure sufficient distribution of the fuel. The fuel nozzle array typically comprises a plurality of fuel nozzle tip assemblies for atomizing fuel into the combustion chamber. The nozzle tips are connected to a fuel manifold which is in fluid communication with a fuel source.

One conventional construction of a fuel manifold employs a machined ring having an annular channel sealed with a plate to form a circumferential fuel distribution passage. An alternative fuel manifold construction involves use of bent tubes rather than machined rings. Nevertheless, the tubes are typically very susceptible to dynamic excitation due to their lack of stiffness and therefore the number of mounting locations of the tubes has to be significantly increased. The tubes are also more difficult to insulate as tube over tubes configurations are difficult to manufacture and assemble. Furthermore, the tubes cannot be readily adaptable to and packaged with, for example, heating devices or heat pipes. In addition, fuel manifolds work under high temperature conditions and there is no tolerance for the risk of fuel leakage. Thus, a conservative design of seals for the fuel manifolds (either machined rings or tubes) is desirable.

Accordingly, there is a need to provide an improved fuel manifold for gas turbine engines.

SUMMARY OF THE INVENTION

It is therefore an object of this invention to provide an improved fuel system having an improved sealing configuration.

In one aspect, the present invention provides a fuel manifold of gas turbine engines for conveying fuel into at least one fuel nozzle tip. The fuel manifold comprises a tube for fluid communication with a fuel source and for connection with the at least one fuel nozzle tip, thereby defining a fuel conveying passage. The fuel manifold further includes a means for providing a redundant seal around the tube and covering substantially an entire length thereof in order to reduce a risk of fuel leakage of the fuel conveying passage.

In another aspect, the present invention provides a fuel system of gas turbine engines which comprises a plurality of circumferentially spaced fuel nozzle tips for injecting fuel into a combustor, and a tube for fluid communication with a fuel source and for connection with the individual fuel nozzle tips, thereby defining a fuel distribution passage. A sealed cavity contains the tube, forming a redundant seal of the fuel distribution passage.

In another aspect, the present invention provides a method of manufacturing a tubular/machined hybrid fuel manifold ring, which comprises steps of a) machining a manifold ring with an annular channel cut into one side thereof; b) placing a tube in the annular channel; c) brazing the tube within the channel to secure the tube therein; d) drilling a plurality of holes at locations of an inlet and individual outlets of the manifold ring, into the manifold ring and tube in order to form the respective inlet and outlets; and d) attaching a plate to the side of the manifold ring in a sealing manner to cover the channel.

Further details of these and other aspects of the present invention will be apparent from the detailed description and figures included below.

DESCRIPTION OF THE DRAWINGS

Reference is now made to the accompanying drawings depicting aspects of the present invention, in which.

DETAILED DESCRIPTION OF THE PREFERRED EMBODIMENTS

Figure 1:
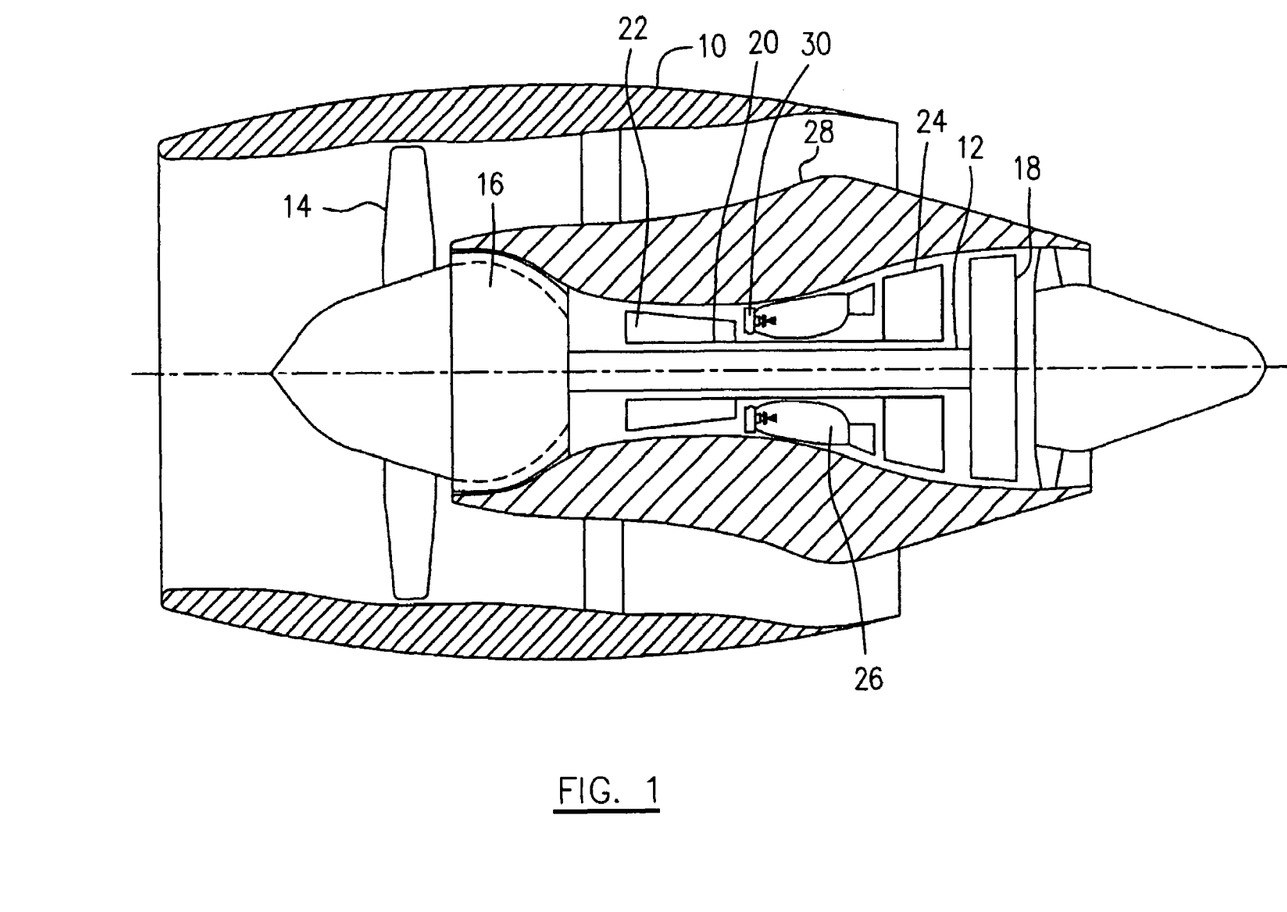
FIG. 1 is a schematic cross-sectional view of a turbofan gas turbine engine which illustrates an exemplary application of the present invention.

A turbofan engine illustrated schematically in FIG. 1, presented as an example of the application of the present invention, includes a housing or nacelle 10, a low pressure spool assembly seen generally at 12 which includes a fan 14, a low pressure compressor 16 and a low pressure turbine 18, a high pressure spool assembly seen generally at 20 which includes a high pressure compressor 22 and a high pressure turbine 24. A core casing 28 surrounds the low and high pressure spool assemblies 12 and 20, to define a main fluid path (not indicated) therethrough. In the main fluid path there is provided a combustor seen generally at 26 with a fuel system 30, to constitute a gas generator section. Ambient air is propelled by the fan 14 and further compressed by the low and high pressure compressors 16, 22, into the combustor 26 in which the compressed air is mixed with fuel injected by the fuel system 30, to be subsequently ignited for generating hot combustion gases used to power the low and high pressure turbines 18, 24.

Referring to FIGS. 14, the fuel system 30 has a hybrid tubular/machined ring arrangement and preferably includes a machined fuel manifold ring 32 containing a tube 34 defining a fuel conveying or distribution passage 35 for a plurality of fuel nozzle tips 36. The fuel nozzle tips 36 are preferably disposed circumferentially spaced apart one from another and are connected to the machined fuel manifold ring 32 at a rear side 38 thereof. The fuel system 30 further includes a fuel supply tube 40 connected to the machined fuel manifold ring 32 and is in fluid communication with a fuel source (not shown) for introduction of fuel into the fuel conveying or distribution passage 35 defined by the tube 34 within the machined fuel manifold ring 32.

Figure 4:
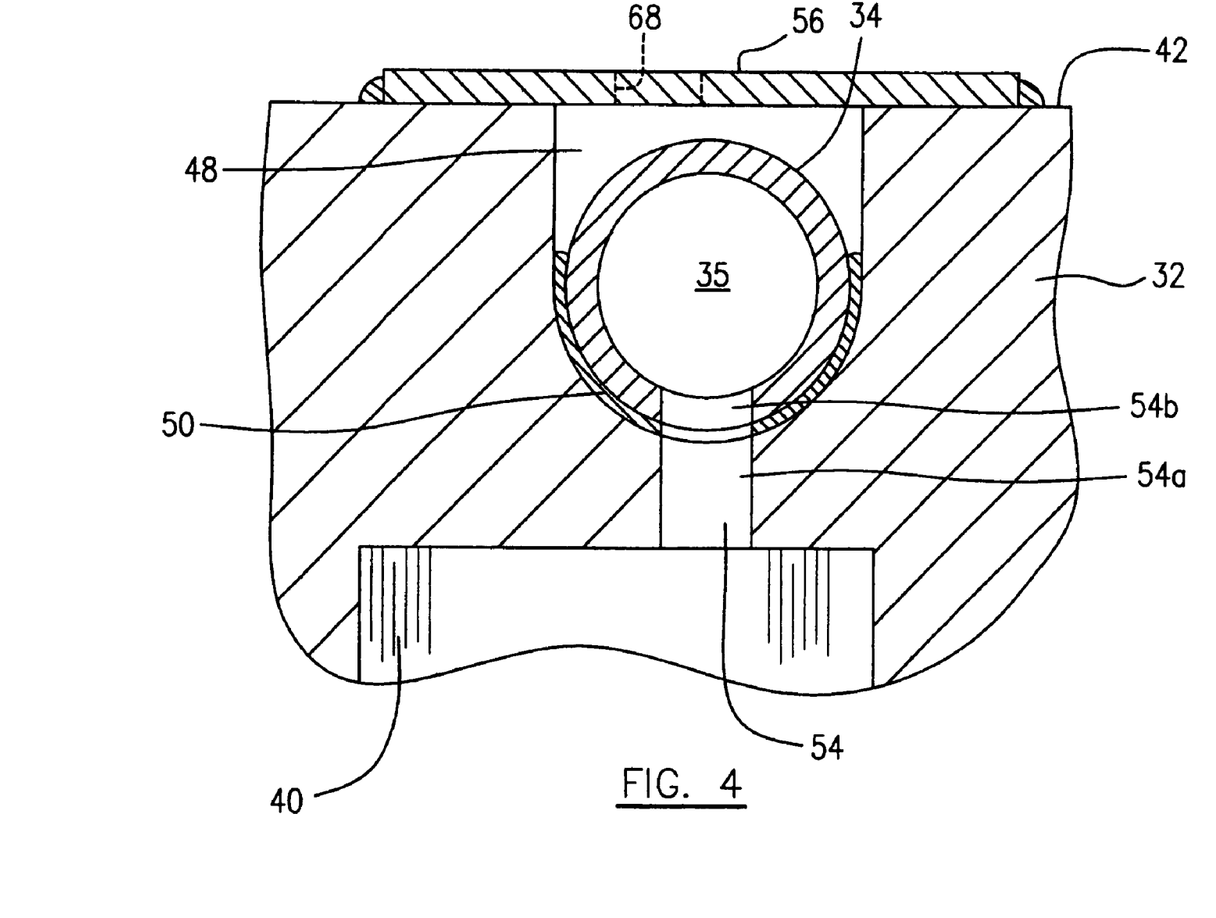
FIG. 4 is a partial cross-sectional view of the hybrid tubular/machined ring according to an alternative embodiment thereof, showing a layer of brazing securing the tube to the channel of the manifold ring while functioning as a seal around the inlet of a fuel distribution passage.

The machined fuel manifold ring 32 preferably further includes a plurality of lugs (not shown) which are attached thereto for mounting the fuel manifold ring 32 within the core engine casing 28. The machined fuel manifold ring 32 is preferably made of a metal material and has, for example, a substantially rectangular cross-section defined axially within the rear side 38 and a front side 42 and radially between an inner periphery 44 and an outer periphery 46 thereof. An annular channel 48 is cut into the front side 42 of the machined fuel manifold ring 32. The tube 34, for example, a continuous annular tube, is placed within the annular channel 48 and is secured therein by a brazing process. As best seen in FIG. 4, a brazing layer 50 disposed within the annular channel 48 between the tube 34 and the inner surface of the machined fuel manifold ring 32 within the channel 48, may extend circumferentially along the entire length of the tube 34 or may be applied to only a number of selected locations. This will be further discussed below.

A plurality of holes 52a (in the machined fuel manifold ring 32) and 52b (in the tube 34) are drilled, preferably from the rear side 38 of the machined fuel manifold ring 32, at predetermined locations for connection with the individual fuel nozzle tips 36, thereby forming a plurality of outlets 52 of the fuel conveying or distribution passage 35 defined by the tube 34. When the individual fuel nozzle tips 36 are mounted to the machined fuel manifold ring 32, which is known in the art and is not further described herein, the individual outlets 52 of the fuel conveying or distribution passage 35 defined by the tube 34 are in fluid communication with the individual nozzle tips 36. There is at least one inlet 54 (see FIG. 4) formed by a pair of holes 54a (in the machined fuel manifold ring 32) and 54b (in the tube 34) which are drilled, for example from the rear side 38 of the machined fuel manifold ring 32, at a predetermined location for connection of the fuel supply tube 40. After the fuel supply tube 40 is mounted to the machined fuel manifold ring 32, which is known in the art and will not be further described herein, the inlet 54 is in fluid communication with the fuel source through the fuel supply tube 40.

Figure 2:
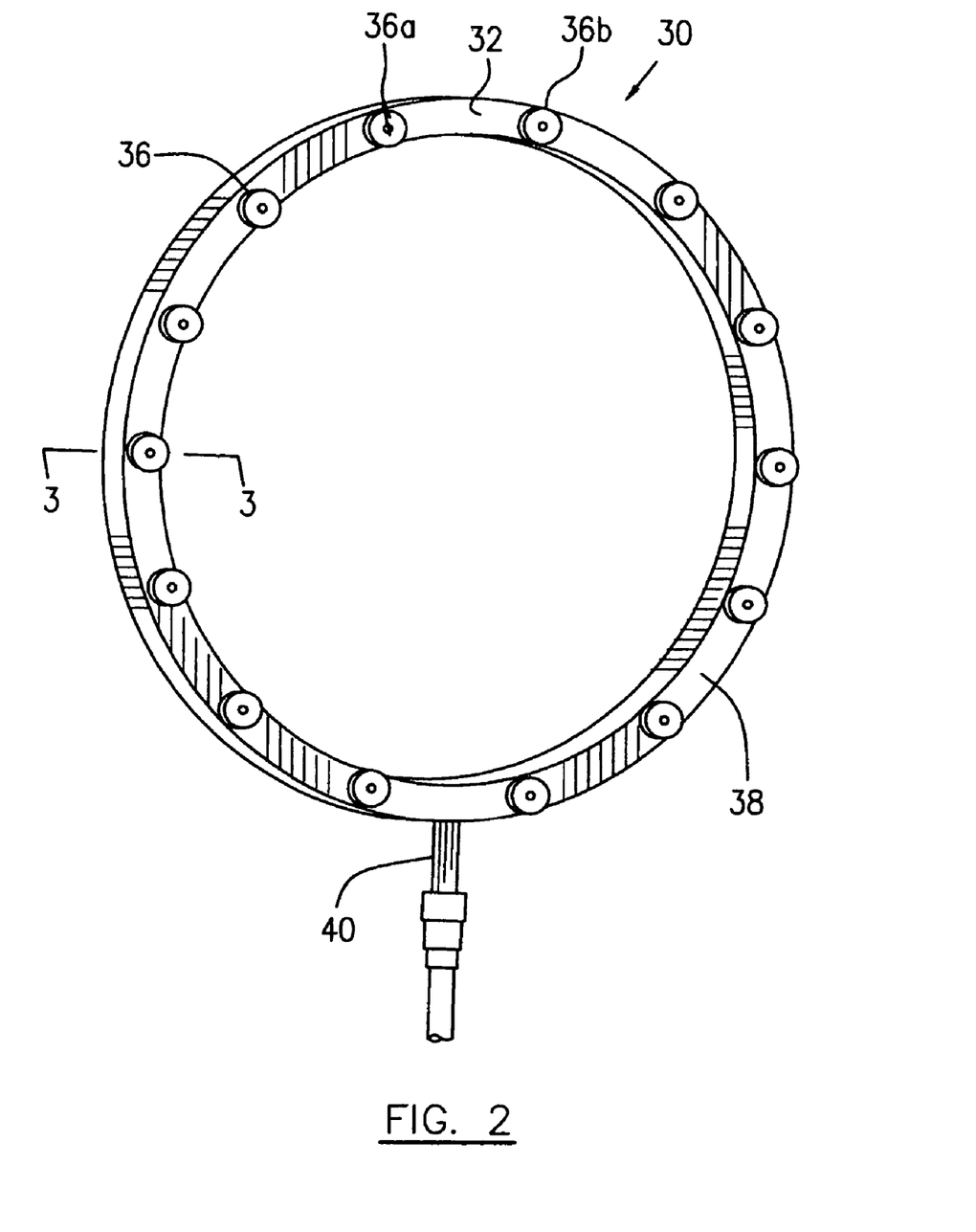
FIG. 2 is a perspective view of a fuel system according to one embodiment of the present invention.
Figure 3:
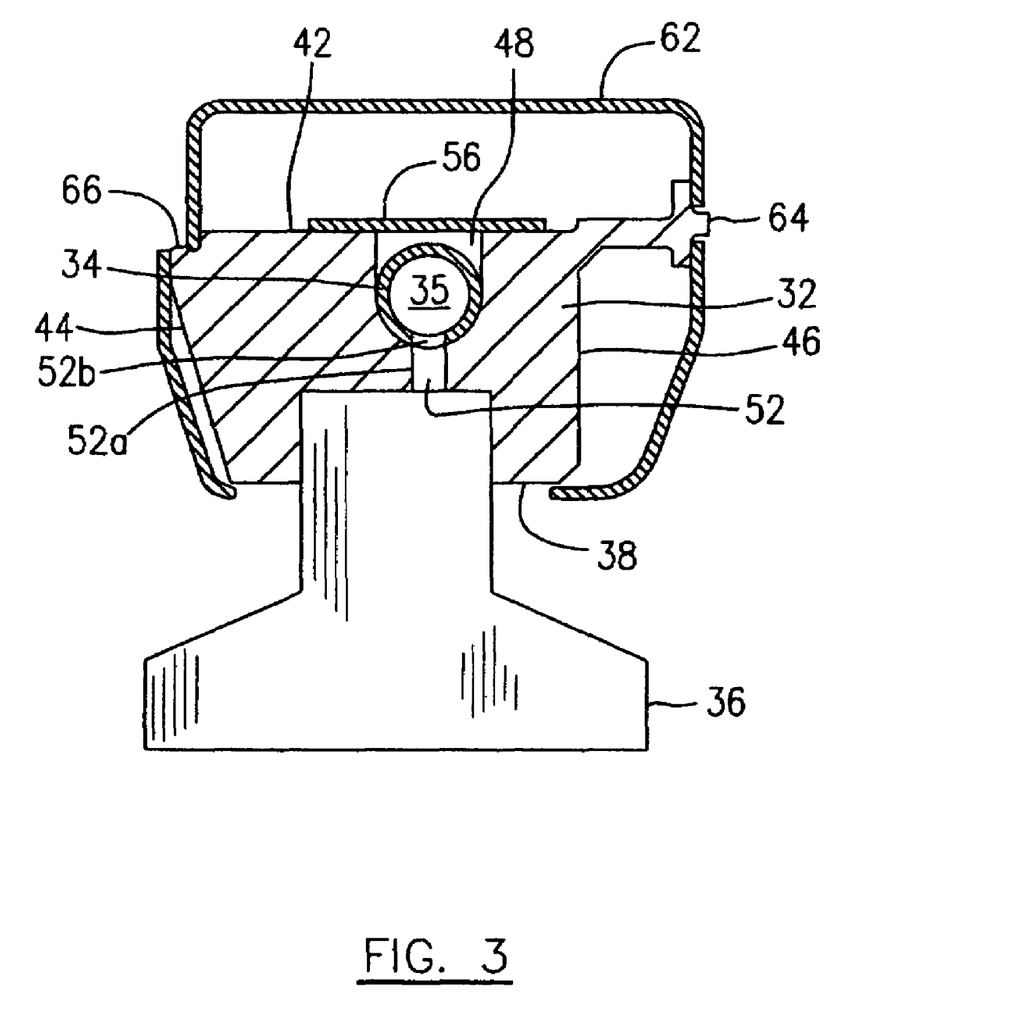
FIG. 3 is a cross-sectional view of the fuel manifold taken along line 3-3 of FIG. 2, illustrating a hybrid tubular/machined ring arrangement of this embodiment of the present invention.

Nevertheless, inlet 54 can also be formed in other orientations, such as in the outer periphery 46 to be adapted for connection with the fuel supply tube 40, arranged as in the illustration of FIG. 2. The locations for brazing the tube 34 for attachment to the machined fuel manifold ring 32 are preferably selected at the locations where holes 52a, 52b and 54a, 54b are to be drilled when the brazing layer 50 does not extend circumferentially over the entire length of the tube 34. Thus, the respective inlet 54 and outlets 52 extend through not only a portion of the machined fuel manifold ring 32 and the tube 34, but also through the brazing layer 50 such that the remaining portion of the brazing layer 50 between the machined fuel manifold ring 32 and the tube 34 around the individual inlet 54 and outlets 52 forms individual seals therearound, in order to prevent fuel leakage from the individual inlet 54, outlets 52 at the interface of the tube 34 and the portion of machined fuel manifold ring 32.

A plate 56, preferably of a flat metal ring is attached to the front side 42 of the machined fuel manifold ring 32, for example by brazing or welding, to cover the annular channel 48 in a sealing manner. Thus, the annular channel 48 forms a sealed cavity containing the tube 34, thereby providing a redundant seal for the fuel conveying or distribution passage 35 defined by the tube 34. In such a configuration, the primary seal which sustains the fuel pressure is the tube wall. A secondary seal is provided by the sealed cavity formed with the annular channel 48 and the attached plate 56. At the locations of the individual inlet 54 and outlets 52, the brazing layer 50 acts as the primary seal.

In a further alternative embodiment, the brazing layer 50 is applied so as to fully encapsulate the tube 34 within the channel 48 of the machined fuel manifold ring 32. In such an embodiment, the encapsulating brazing layer around the tube 34 not only acts as a means for securing the tube 34 within the channel 48, but also acts as a means for providing additional sealing around the tube 34.

Figure 5:
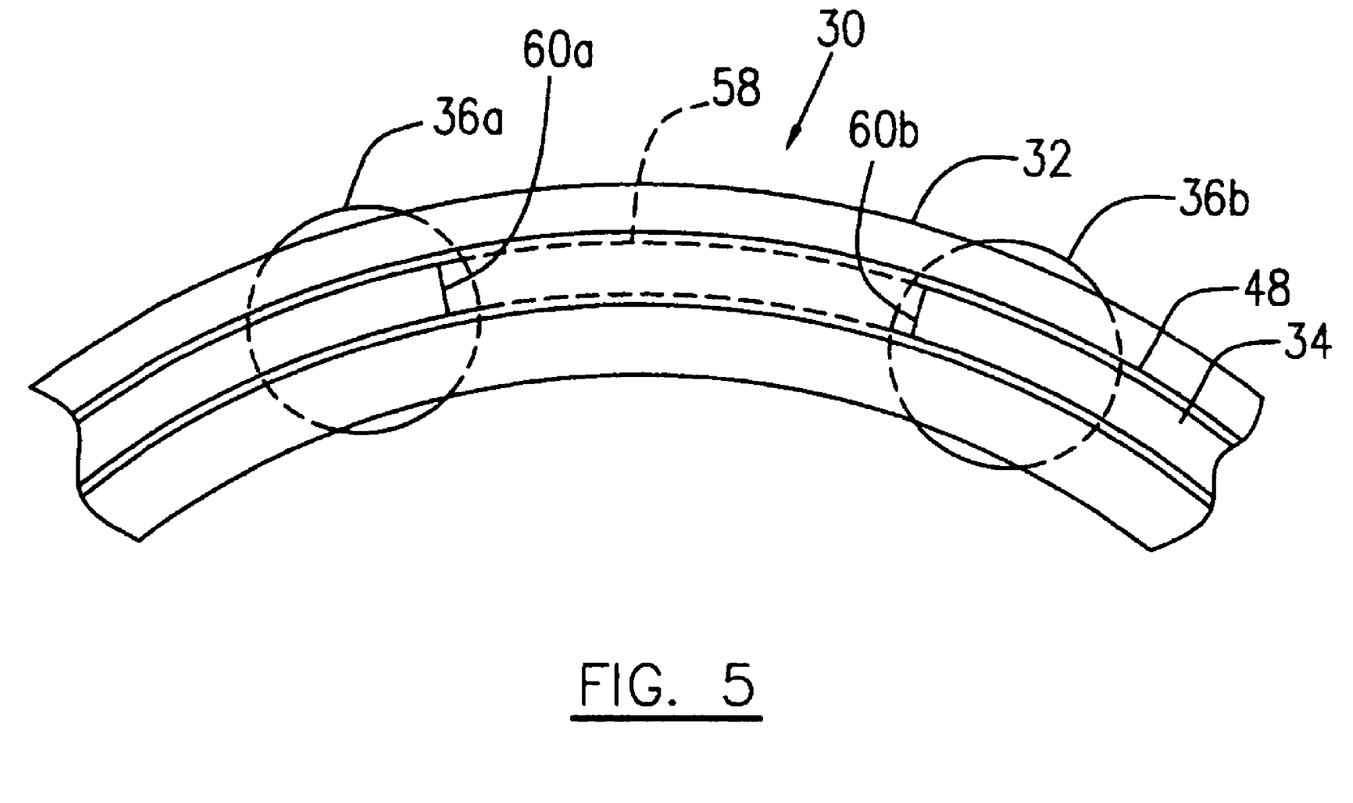
FIG. 5 is a partial front elevational view of the hybrid tubular/machined ring of FIG. 2, with the protective cover and plate removed, showing a blocked section or closed opposite ends of a tube attached within an annular channel in a machined fuel manifold ring.

It has been noted that stagnant pressurized fuel will occupy a tube section which is located between two adjacent uppermost fuel nozzle tips 36a, 36b, substantially diametrically opposite to the fuel supply tube 40. This un-moving fuel will be susceptible to coking because it is relatively easily heated. Thus, this section of tube 34 is preferably blocked, for example, by crimping this section of tube 34 as shown in broken lines 58 (see FIG. 5). In an alternative embodiment of the present invention, the tube 34 can be configured in a discontinued annular ring shape with opposed ends 60a, 60b (see FIG. 5) closed, for example, by inserting and attaching a plug (not shown) at the tube ends. In such a configuration, the tube fuel nozzle tips 36a, 36b with the connected outlets 52 which are most distal to the medially positioned fuel supply tube 40 with the connected inlet 54, are located at the respective closed ends 60a, 60b in order to leave no room in the fuel conveying and distribution passage 35, for any non-moving fuel volume therein.

A protective cover and heat shield 62, for example of sheet metal, is preferably provided to cover at least the front side 42, but preferably also the inner and outer peripheries 44, 46, of the machined fuel manifold ring 32. In the embodiment of the present invention illustrated in FIG. 3, a plurality of support elements 64, 66 are securely attached to the machined fuel manifold ring 32 and are circumferentially spaced one from another along the entire circumferential length of the machined fuel manifold ring 32. The respective support elements 64, 66 engage with a plurality of holes (not indicated) defined in the protective cover 62 in locations corresponding to the respective support elements 64, 66 such that the protective cover 62 is removably attached to the machined fuel manifold ring 32 for protectively covering the front side 42 and the inner and outer peripheries 44, 46 of the machined fuel manifold ring 32. When the fuel supply tube 40 is mounted to one of the front side 42 and inner and outer peripheries 44, 46 of the machined fuel manifold ring 32, as shown in FIG. 2, the protective cover 60 includes an aperture thereof (not shown) in a complimentary location to allow the fuel supply tube 40 to extend therethrough. The above-described support elements 64, 66 are exemplary only. Support elements of various types which are known in the art can be securely attached to or integrally produced with the machined fuel manifold ring 32 for removably mounting the protective cover 62 to the machined fuel manifold ring 32.

The hybrid tubular/machined ring configuration of the present invention can be conveniently manufactured in a preferred manufacturing method. The machined fuel manifold ring 32 is semi-finish machined such that the annular channel 48 has been cut. Following a step of placing the tube 34 into the annular channel 48 in the machined fuel manifold ring 32, the tube 34 is then brazed within the channel 48. After the tube 34 is secured within the channel 48, holes 52a, 52b and 54a, 54b are drilled into the respective machined fuel manifold ring 32 and the tube 34, preferably also through the brazing layer 50, in order to form the respective outlets 52 and inlet 54. The fuel inlet 54 can be used to introduce pressurized fluid into the fuel conveying and distribution passage 35 defined within the tube 34 when all the outlets 52 are temporarily blocked in order to check the leakage of the fuel conveying and distribution passage 35. The plate 56 covering the annular channel 48 preferably includes a hole 68 (shown by broken lines in FIG. 4) with a fitting (not shown) mounted therein such that the hole or fitting can be used to introduce pressurized fuel therethrough into the sealed cavity defined around the tube 34, for leakage tests of the redundant seal defined by the sealed cavity. The hole or fitting in the plate 56 can be capped or permanently plugged following the leakage test of the sealed cavity.

The present invention advantageously creates a more conservative design of fuel systems to provide sealing redundancy, while being nonetheless cost and time effective to manufacture. This hybrid tubular/machined ring configuration of a fuel system according to the present invention, is also of interest from other perspectives. This arrangement still allows for simple packaging of add-ons such as heat-pipes and heating elements. Furthermore, the stiffness of the hybrid tube machined ring construction of the present invention can still be tuned to act as a stabilizer for dynamic issues.

The above description is meant to be exemplary only, and one skilled in the art will recognize that changes may be made to the embodiments described without departure from the scope of the invention disclosed. For example, more than one inlet and multiple fuel supply tube may be added to the above-described embodiments and the cross-section of the machined fuel manifold ring may be configured in any profile other than substantially rectangular. Furthermore, the redundant manifold sealing concept of the present invention may be applied to other types of fuel manifolds other than a manifold ring configuration as described in above-embodiments. Still other modifications which fall within the scope of the present invention will be apparent to those skilled in the art, in light of a review of this disclosure, and such modifications are intended to fall within the appended claims.

The invention claimed is:

1. A fuel manifold of a gas turbine engine for conveying fuel into at least one fuel nozzle tip, the fuel manifold comprising:
a tube for fluid communication with a fuel source and for connection with the at least one fuel nozzle tip, thereby defining a fuel conveying passage through the tube; and
a means for providing a redundant seal around the tube and covering substantially an entire length thereof in order to reduce a risk of fuel leakage of the fuel conveying passage, said means including a manifold body of the manifold with a non-fluid conveying channel formed in one side thereof within which is received the tube and a plate attached to the side of the manifold body covering the channel in a sealing manner such as to form a sealed cavity containing the tube, wherein the tube abuts at least one wall of the channel and is permanently fastened thereto at at least a number of points along the channel.

2. The fuel manifold as defined in claim 1, wherein the tube is permanently fastened to said at least one wall of the channel braze.

3. The fuel manifold as defined in claim 2, wherein the means comprises a brazing layer encapsulating substantially the entire tube within said channel.

4. The fuel manifold as defined in claim 1, wherein the channel outside said tube is substantially free of fluid flow therein.

5. The fuel manifold as defined in claim 1, wherein the manifold body comprises a manifold ring with the channel formed therein, the channel being annular and extending about said manifold ring.

6. The fuel manifold as defined in claim 5, wherein the tube is a continuous annular tube disposed within the annular channel.

7. The fuel manifold as defined in claim 5, wherein the tube is in a discontinued-annular ring shape with opposed ends closed.

8. A fuel system of gas turbine engines comprising:
a plurality of fuel nozzle tips for injecting fuel into a combustor;
a tube for fluid communication with a fuel source, the tube being disposed in fluid flow connection with the individual fuel nozzle tips, thereby defining a fuel distribution passage; and
a sealed cavity defined in a fuel manifold and containing the tube therein, thereby forming a redundant seal of the fuel distribution passage, the sealed cavity including a channel formed in one side of a body of the fuel manifold within which is received the tube and a plate attached to the side of the manifold body covering the channel in a sealing manner, wherein the sealed cavity enclosed such as to prevent entry of fluid therein, a portion of the channel surrounding the tube thereby being free of fluid flow therein.

9. The fuel system as defined in claim 8, wherein the fuel manifold comprises a manifold ring defining the manifold body, the channel formed therein being annular.

10. The fuel system as defined in claim 9, wherein the respective manifold ring and tube define a plurality of aligned holes, thereby forming at least one inlet of the distribution passage for fluid communication with the fuel source and forming a plurality of outlets in fluid communication with the individual nozzle tips.

11. The fuel system as defined in claim 10, wherein the respective inlet and outlets comprise seals therearound between the tube and the manifold ring.

12. The fuel system as defined in claim 10, wherein the tube is in a discontinuous annular ring shape with opposed closed ends.

13. The fuel system as defined in claim 12, wherein the inlet is in communication with the tube at a middle portion thereof opposite said closed ends.

14. The fuel manifold as defined in claim 12, wherein two of the outlets are in communication with the tube at the respective closed ends thereof.

15. The fuel system as defined in claim 10, wherein the tube is a continuous annular tube having a blocked section between two of the outlets.

16. The fuel system as defined in claim 15, wherein the blocked section of the tube is located substantially diametrically opposite to the inlet.

17. The fuel system as defined in claim 9, further comprising a protective cover covering at least the side of the manifold ring to which the plate is attached.

* * * * *

UNITED STATES PATENT AND TRADEMARK OFFICE
CERTIFICATE OF CORRECTION

PATENT NO.        : 7,559,201 B2
APPLICATION NO.   : 11/220849
DATED             : July 14, 2009
INVENTOR(S)       : Alexander et al.

It is certified that error appears in the above-identified patent and that said Letters Patent is hereby corrected as shown below:

Column 5, Claim 1, Lines 35-51: should read -- A fuel manifold of a gas turbine engine for conveying fuel into at least one fuel nozzle tip, the fuel manifold comprising: the at least one fuel nozzle tip injecting fuel into a combustor; a tube in fluid communication with a fuel source and in fluid flow connection with the at least one fuel nozzle tip, whereby defining a fuel conveying passage through the tube; and a means for providing a redundant seal around the tube and covering substantially an entire length thereof in order to reduce a risk of fuel leakage of the fuel conveying passage, said means including a manifold body of the fuel manifold with a non-fluid conveying channel formed in one side thereof within which is received the tube and a plate attached to the side of the manifold body covering the channel in a sealing manner to form a sealed cavity containing the tube, wherein the tube abuts at least one wall of the channel and is permanently fastened thereto at least a number of points along the channel. --

Column 6, Claim 8, Lines 11-27: should read -- A fuel system of gas turbine engines comprising: a plurality of fuel nozzle tips injecting fuel into a combustor; a tube in fluid communication with a fuel source, the tube being disposed in fluid flow connection with the individual fuel nozzle tips, thereby defining a fuel distribution passage; and a sealed cavity defined in a fuel manifold and containing the tube therein, thereby forming a redundant seal of the fuel distribution passage, the sealed cavity including a channel formed in one side of a body of the fuel manifold within which is received the tube and a plate attached to the side of the manifold body covering the channel in a sealing manner, wherein the sealed

UNITED STATES PATENT AND TRADEMARK OFFICE
CERTIFICATE OF CORRECTION

PATENT NO.         : 7,559,201 B2
APPLICATION NO.    : 11/220849
DATED              : July 14, 2009
INVENTOR(S)        : Alexander et al.

It is certified that error appears in the above-identified patent and that said Letters Patent is hereby corrected as shown below:

cavity enclosed to prevent entry of fluid therein, a portion of the channel surrounding the tube thereby being free of fluid flow therein. --

Signed and Sealed this

Twenty-fifth Day of August, 2009

David J. Kappos
*Director of the United States Patent and Trademark Office*